(12) United States Patent  (10) Patent No.: US 8,221,874 B1
Zhao et al.  (45) Date of Patent: Jul. 17, 2012

(54) DURABLE GLASS FIBER REINFORCED PANEL

(75) Inventors: Wenping Zhao, Granger, IN (US); Robert Barney, Elwood, IL (US); Todd B. Irick, Middlebury, IN (US)

(73) Assignee: Crane Composites Inc., Channahon, IL (US)

( * ) Notice: Subject to any disclaimer, the term of this patent is extended or adjusted under 35 U.S.C. 154(b) by 0 days.

(21) Appl. No.: 12/565,516

(22) Filed: Sep. 23, 2009

(51) Int. Cl.
  *B32B 21/02* (2006.01)
(52) U.S. Cl. ............... 428/292.4; 428/326; 428/423.7; 296/181.2
(58) Field of Classification Search ............. 428/292.4, 428/326, 423.7; 296/181.2
  See application file for complete search history.

(56) References Cited

U.S. PATENT DOCUMENTS

| | | | |
|---|---|---|---|
| 3,993,828 A * | 11/1976 | McCorsley, III | 442/244 |
| 4,179,540 A * | 12/1979 | Smarook | 428/71 |
| 4,309,334 A * | 1/1982 | Valitsky | 522/17 |
| 4,568,604 A | 2/1986 | Kurtz et al. | 428/297 |
| 4,664,982 A * | 5/1987 | Genovese et al. | 428/447 |
| 5,019,197 A * | 5/1991 | Henderson | 156/212 |
| 5,135,793 A * | 8/1992 | Socha | 428/74 |
| 5,153,058 A | 10/1992 | Hall et al. | 428/319 |
| 5,445,877 A | 8/1995 | Kawakami et al. | 428/283 |
| 5,543,225 A * | 8/1996 | Mueller et al. | 428/423.1 |
| 5,549,969 A | 8/1996 | Parish | 428/241 |
| 6,179,371 B1 * | 1/2001 | Miller | 296/191 |
| 6,854,499 B2 * | 2/2005 | Miller | 156/500 |
| 7,118,699 B2 | 10/2006 | Lauersdorf et al. | 264/255 |
| 7,150,915 B2 * | 12/2006 | Kia et al. | 428/423.7 |
| 7,255,822 B2 * | 8/2007 | Bledsoe et al. | 264/261 |
| 2003/0143373 A1 * | 7/2003 | Bledsoe et al. | 428/138 |
| 2004/0023012 A1 | 2/2004 | Kia et al. | 428/212 |
| 2004/0038059 A1 | 2/2004 | Kia et al. | 428/515 |
| 2005/0203202 A1 * | 9/2005 | Weine Ramsey | 522/71 |
| 2007/0237965 A1 * | 10/2007 | Rosthauser | 428/423.1 |
| 2008/0001429 A1 * | 1/2008 | Willis et al. | 296/181.2 |
| 2008/0070019 A1 | 3/2008 | Good et al. | 428/218 |
| 2008/0081170 A1 | 4/2008 | Tilbrook et al. | 428/292.1 |
| 2008/0090060 A1 | 4/2008 | Kia et al. | 428/215 |
| 2009/0004477 A1 * | 1/2009 | Malle et al. | 428/412 |
| 2009/0137728 A1 * | 5/2009 | Sumner et al. | 524/563 |

* cited by examiner

*Primary Examiner* — N. Edwards
(74) *Attorney, Agent, or Firm* — Fitzpatrick, Cella, Harper & Scinto

(57) ABSTRACT

A durable composite sheet is provided, with a method of manufacturing the composite sheet. The method includes using a crack-resistant reinforcement panel between a gel coat and a reinforcement panel, which may be of lauan or of other materials. At least one outer coat of material is applied onto a mold surface. A barrier layer may be formed on the outer coat, preferably by spraying. At least one coat of a resin material, containing a curable resin and optionally a filler, and a fibrous reinforcement material are applied over the outer coat (over the barrier layer if present) to form a reinforcement layer. The reinforcement panel is applied to the crack-resistant reinforcement layer, and is bonded thereto.

6 Claims, 3 Drawing Sheets

DURABLE GLASS FIBER REINFORCED PANEL

TECHNICAL FIELD

This invention relates in general to a method and apparatus for the manufacture of fiber-reinforced panels, and in particular, to a method and apparatus for the manufacture of a composite sheet suitable for such uses as a recreational vehicle ("RV") wall.

BACKGROUND OF THE INVENTION

Field of the Invention

It is commonplace in the manufacture of recreational vehicles to use composite sheets, such as glass fiber-reinforced wall panels, for the exterior surface of the recreational vehicle. These wall panels vary in dimensions up to, and including, from 2.4 to 3 meters (8 to 10 feet), and can have a length as great as 15 meters (50 ft.) or more.

For a number of years, various manufacturers have produced sheet glass panels for RV exterior walls in which the panels contain layers of lauan plywood and of fiberglass-reinforced polymeric material, as well as a smooth outer surface. These panels have the structure of (i) a gel coat with (ii) chopped glass and resin composite reinforcement with (iii) a lauan plywood substrate, and are made by an open-mold-spraying and vacuum-bagging process (i.e., applying a vacuum using a bag for pressure containment). The low-viscosity liquid unsaturated polyester resin that is mixed with the chopped glass to provide the reinforcement can fill the gaps between the edges of the lauan panels, and partially penetrate the plywood.

The process of making such a composite material begins with an elongate mold. The mold is somewhat larger than the panels to be made, but large enough to accommodate the 3×15 meter (10×50 ft.) panels. The upper surface of the mold is a finished surface to provide a substantially flat and smooth surface to the panel, as it is this surface which forms the exterior surface of the panels to be made.

The mold is first sprayed with a coating known as a gel coating, which cures to form a high gloss exterior surface for the panel. Once this layer has been cured, a resin and fiberglass are placed on the backside of the gel coating, and then a plurality of panels of lauan are positioned side by side on top of the fiberglass to provide strength to the product. Typically, a vacuum bag is then placed over the top of the panels and a slight vacuum is introduced, which draws resin into the lauan panels, and the resin is cured, to form a finished product. The completed product is then removed from the mold and cut and trimmed to the proper size.

Recreational vehicle sidewall panels are exposed to various weather conditions, including heat, cold and humidity. The sidewall panels have a tendency to crack due to weather changes. The phenomenon is called micro-cracking, or thermal fatigue cracking, or sometimes thermal shock cracking. Such a crack generally occurs in the glass fiber reinforced laminate and gel coat.

Crane Composites produces an all-composite exterior wall panel (sold under the trademark CTEC) for use in recreational vehicles. This material has uniform and consistent properties, does not crack, does not absorb water and will not rot. However, the raw-material costs are high, and the manufacture of this product requires considerable investment, and requires a longer molding cycle time than is encountered in manufacturing panels reinforced with lauan.

Prior approaches that do not involve replacing lauan with a synthetic material have been made to dealing with the problem of cracking. One approach has been to increase the layer thickness of the fiber reinforced laminate. This approach can effectively reduce the tendency to crack; however, this approach also results in a significant increase in panel cost and weight, due to the amount of additional material used and processed. The increase in panel weight can also increase the recreational vehicle weight, which in turn means less loading capacity and more energy consumption for the consumer.

As stated, the general manufacturing process for RV sidewall panels includes the following process steps: (1) spraying a thin layer of gel coat onto a mold, (2) laying down or spraying the glass fiber reinforced laminate onto the gel coat layer, (3) applying a substrate such as a lauan wood sheet as a strengthening panel or substrate, and (4) using vacuum bagging to reduce air entrapment between the layers and promote good adhesion between the layers (this last step is commonly done, but not always).

The present invention is mainly related to the layer of laminate next to the gel coat, which is manufactured in process step (2). This composite layer is generally composed of glass fiber and resin, typically unsaturated polyester resin.

SUMMARY OF THE INVENTION

The object of providing an advance over existing composite materials, as well as other objects not specifically enumerated, are achieved by a method and apparatus for manufacturing a composite sheet according to the present invention. A method of manufacturing a composite sheet according to the present invention involves providing an effective crack-resistant composite reinforcement layer between the gel coat and the reinforcement panel, these latter two layers being of conventional manufacture. A mold surface onto which the composite sheet may be formed is provided. At least one outer coat of material is applied onto the mold surface to form the gel coat. A bather layer may optionally be formed on the outer coat, preferably by spraying. At least one coat of a resin material, containing a curable resin and optionally a filler, and a fibrous reinforcement material are applied over the outer coat (over the barrier layer if present) to form a composite reinforcement layer. The reinforcement panel is applied to the crack-resistant composite reinforcement layer, and is bonded thereto.

In one aspect of the present invention, a filler is mixed into the laminate resin. In various embodiments, the filler can be solid particles, hollow particles, or a mixture of both. The filler particles can also have various shapes, such as granular, flake/plate, and needle/fiber. Different filler sizes, including micro-size and nano-size, can be utilized. Among other types of fillers that are suitable are calcium carbonate ($CaCO_3$) and mica, although the invention is not limited to these materials.

In one embodiment, the filler particles can be self-healing micro-capsules. Once a micro-crack forms and extends close enough to one or more of the micro-capsules, the micro-capsules are damaged sufficiently to release their contents. This begins a healing process, repairing the micro-crack. Thus, the growth of micro-cracks is halted quickly, before there is an opportunity for them to grow into cracks of the size that have been troublesome in conventional panels.

According to another aspect of the invention, a non-conventional resin is used in forming the composite reinforcement layer. For example, the conventional unsaturated polyester resin is modified, in one embodiment, by the inclusion in it of a tough vinyl ester resin or epoxy resin.

According to another aspect of the invention, it has been found that careful selection of the fiber length or sizing causes the resin to wet through the fiber to a degree not found in conventional panel materials, with the result of a large improvement in the panel's resistance to cracking.

According to still another aspect of the invention, a tough barrier layer is added between the laminate layer and the gel coat. The barrier layer, for example, can be located in between the gel coat and laminate to block a crack that forms in the laminate from penetrating to the surface of the gel coat.

Various additional objects and advantages of this invention will become apparent to those skilled in the art from the following detailed description of the preferred embodiment, when read in light of the accompanying drawings.

DETAILED DESCRIPTION OF THE PREFERRED EMBODIMENTS

Figure 1:
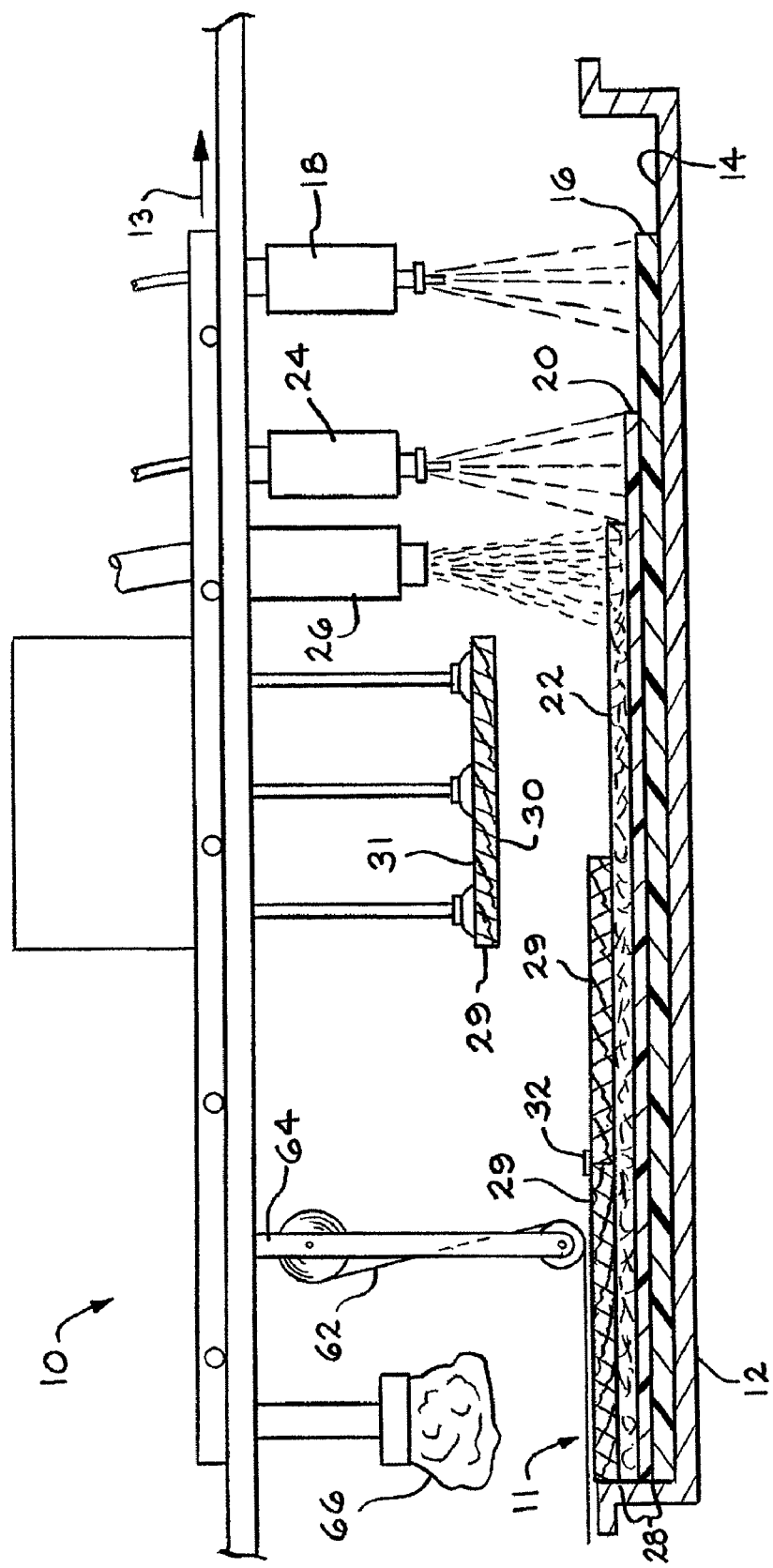
FIG. 1 is a schematic view in elevation, partially in cross-section, of an apparatus and process for manufacturing a composite sheet according to the invention.

Referring now to the drawings, there is shown in FIG. 1 an apparatus 10 for manufacturing a composite sheet 11 according to the invention. The illustrated manufacturing process involves passing a series of manufacturing operations over an elongate mold 12 in a direction, indicated by the arrow 13 in FIG. 1. The mold 12 is made of any suitable material, such as fiberglass. Typically the mold 12 is somewhat larger than the composite sheet to be made, and large enough to accommodate a 3×15 meter (10×50 ft.) composite sheet. An upwardly facing surface 14 of the mold 12 has a smooth face to provide a substantially flat and smooth surface to the composite sheet 11. The surface 14 forms the exterior surface of the composite sheet to be made.

In a first step of the manufacturing process, an outer coat of material is applied to the surface 14 of the mold 12. Typically, the outer coat 16 is a gel coat. The gel coat 16 is a commercially available quick setting polymer applied to the surface of a mold. The gel coat 16 cures to form a high gloss exterior surface for the finished composite sheet 11. The gel coat 16 may include a pigment and provides a durable and esthetically pleasing outer surface for the finished composite sheet 11. Preferably, the gel coat 16 is applied in two layers by a sprayer 18. Typically, the sprayer 18 is moved longitudinally along rails and sprays the entire length of the elongate mold 12. Preferably, the sprayer 18 is a conventional sprayer, such as one that is commercially available from Magnum Venus of Kent, Wash. The spray head of the sprayer 18 preferably spans transversely across the mold 12 and discharges the gel coat 16 in a spray pattern and with a substantially uniform thickness. Preferably, the gel coat 16 is a polymer having a catalyst which sets to a gel in about 20 minutes and cures, or hardens, in about 35 minutes.

It will be understood that more than one sprayer 18 may be used to apply the gel coat 16, and that other methods for applying the gel coat 16 can be used.

In a second step of the manufacturing process, a composite mixture of resin material 20 and reinforcement material, such as chopped fiberglass 22, is applied to the gel coat 16 to form a reinforcement layer 28. The resin material 20 may comprise a polymer similar to the gel coat 16, but without a pigment. The resin material 20 may be any suitable commercially available polyester resin, such as CoREZYN COR61-AA-261 DCPD laminating resin, from Interplastic Corporation, Minneapolis, Minn. Preferably, however, a polyester/epoxy blend resin having a low shrink characteristic, such as AME 2000 LB 6527-017, from the Ashland Specialty Chemical Company, Composite Polymers Division, Bartow, Fla., will be used. Other types of resin having low shrink characteristic, such as a polyester/vinyl-ester blend, are also suitable.

As mentioned, however, it is also preferred to include a filler in the resin material 20, especially if low-shrink characteristic resin is not used. Materials suitable for use as the filler include mica and calcium carbonate, but other materials are also acceptable. The filler particles can be of various shapes, including granular, flake/plate, and needle/fiber. Preferably, the amount of filler in the resin material should be 5% to 25% by weight. In the case of mica, the inventors have found that a filler content of 10% by weight provides significant improvements without sacrificing processing feasibility.

While it has been conventional to use glass fibers 22 of about an inch in length, the inventor has found that reducing this length by about half produces an improvement in crack-resistance. The invention is not limited, however, to the use of this reduced length (0.5-0.625 in.).

Figure 2:
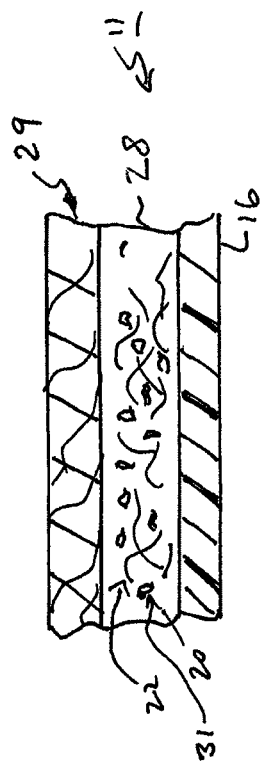
FIG. 2 is an enlarged cross-sectional view in elevation of the composite sheet produced using the apparatus and process of FIG. 1.

An example of the structure of a composite material 11 according to the invention is illustrated schematically in FIG. 2, which is a view in cross-section. The crack-resistant composite reinforcement layer 28 in FIG. 2 comprises resin and glass fibers 22, and particles of a filler material, indicated (on a much exaggerated scale) as flakes or granules 31. As explained above, however, this shape of filler particle is not the only one within the scope of the invention. Indeed, in one specific embodiment, the inventor has found that quite good results in terms of resistance to cracking are obtained by using mica particles of a micro-size, specifically about 23 μm, in an amount of about 10% by weight, in combination with using the reduced length of glass fibers 22 described above. In fact, it has been found that in this specific embodiment a surprisingly large reduction in the material's susceptibility to cracking was obtained, of more than 50%.

Figure 3:
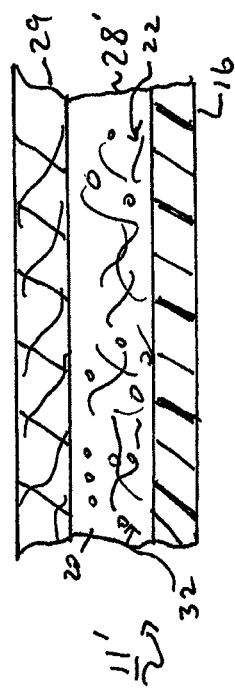
FIG. 3 is an enlarged cross-sectional view in elevation of a variation of the composite sheet of FIG. 2.

The filler particles need not be solid particles, but may be hollow, or a mixture of hollow and solid ones. In one embodiment 11 of the material of the invention, in particular, the filler particles can be self-healing micro-capsules 32 (see FIG. 3). Such a micro-capsule 32 may be quite small, even of nano-size (for example, on the order of 100 Å), and contains a monomer as well as a material that can trigger polymerization of the monomer on contact. The trigger material, of course, is kept separate from the monomer in the micro-capsule. If a crack, even a micro-crack, forms in the composite reinforcement layer 28 in the vicinity of one or more such micro-capsules, or forms elsewhere and grows until it is close enough, the micro-capsules are damaged sufficiently to release their contents. This causes the encapsulated trigger and monomer to come into contact, resulting in polymerization of the latter, and as a result a bonding together of the sides of the crack. Thus, the growth of micro-cracks is halted quickly, before there is an opportunity for them to grow into cracks of the size that have been troublesome in conventional RV wall panels. For this purpose it is especially preferred that the monomer is one that forms a polymer that is highly compatible with the resin used in forming the reinforcement layer 28.

Returning now to the description of the process of the present invention, it is preferable that the resin material 20, consisting of the resin pre-mixed with the filler, is applied by a resin sprayer 24, and the fiberglass 22 is applied by a fiberglass applicator 26. The resin sprayer 24 and the fiberglass applicator 26 are preferably both conventional. The fiberglass applicator 26 is designed for chopping fiberglass fibers 22 and dispensing the chopped fibers 22 in various sizes to form the laminate reinforcement layer 28 consisting of a mixture of the resin material 20 and the fiberglass fibers 22. Such dispensing and spray apparatus may be obtained commercially, for example from Magnum Venus.

Like the sprayer 18, the sprayer 24 and applicator 26 preferably move longitudinally along rails, span transversely across the mold 12, and discharge resin material 20 and chopped fiberglass 22, respectively, in a pattern and with a substantially uniform thickness. It will be understood that more than one resin sprayer 24 and fiberglass applicator 26 may be used to apply the resin material 20 and the fiberglass fibers 22. When applying the resin material 20 and the chopped fiberglass 22, either the resin material 20 or the fiberglass 22 can be applied first, or the resin material 20 and the fiberglass 22 can be applied simultaneously. The reinforcement layer 28 may be rolled with weighted rollers (not shown) to remove air from the reinforcement layer 28.

In an alternative embodiment of the invention (not shown), the chopped fiberglass fibers are replaced by a glass mat or other suitable reinforcement material. The mat is applied to the resin in a manner similar to the chopped fiberglass fibers described above. In a further such alternative embodiment, such a glass mat is saturated with the polymer resin material 20 and applied on top of the gel coat material 16, thereby eliminating the steps of applying the chopped fiberglass 22 and spraying the resin material 20. Furthermore, the mat may comprise non-woven mat, or a stitched or knitted mat so as to provide strength characteristics as desired. The reinforcement layer 28 is applied on top of such a non-woven mat.

In a third step of the manufacturing process, a plurality of lauan or other reinforcement panels 29 are applied to the reinforcement layer 28 in a side-by-side manner to cover the reinforcement layer 28 when the resin material 20 is still wet, so that the resin of the composite reinforcement layer can impregnate and form a strong bond with the reinforcement panels 29. The panels 29 are abutted together along their respective edges, and typically have a length equal to the width of the composite panel 11 that is being manufactured. Thus, for example, the reinforcement panels may be 1.2×2.4 meter (4 ft.×8 ft.) panels, and the 2.4 m (8 ft.) length of the panel 29 corresponds to the width of the composite sheet 11.

As shown in FIG. 1, the panels 29 can be lowered onto the reinforcement layer by mechanical means, but it is also within the broad scope of the invention for them to be put in place manually.

If desired, strips of webbing 32, such as strips of fiberglass mat, are wetted with a catalyzed resin and applied at each seam between adjacent reinforcement panels 29 to reinforce the composite sheet 11.

It is possible that pockets of air may become trapped between the reinforcement panel 29 and the gel coat layer 16 of the composite sheet 11. More particularly, air may become trapped between the reinforcement panel 29 and the reinforcement layer 28. Such trapped air can cause a distorted appearance on the finished surface 16 of the composite sheet 11, and this results in composite sheets 11 that must be scrapped or remanufactured, adding cost and time to the manufacturing process. The distorted appearance may worsen over time due to the effects of heat related expansion and contraction of both the trapped air and the composite sheet 11.

In a fourth step of the manufacturing process, therefore, means for applying a vacuum, such as a conventional vacuum bag 66, is placed around the mold 12. The vacuum bag may be secured to the mold 12 by any suitable means, such as an elastomeric band or clamps (not shown). The vacuum bag includes a plurality of vacuum lines, which are connected to a vacuum pump. The vacuum pump creates a vacuum pressure, preferably within the range of from about 5.0 cm (2.0 in.) Hg to about 77.8 cm (30.0 in.) Hg. More preferably, the vacuum pump creates a vacuum pressure of about 13-39 cm (5-15 in.) Hg. One piece of conventional plastic breath sheet is used for covering the entire mold 14 (and thus the entire composite panel 11). The breath sheet may be of the material sold under the trademark Mylar (which is a trademark of E.I. DuPont de Nemours & Co.), although other materials can be used in addition, as is known to those in the art. The vacuum pump pulls the air from between the vacuum bag and the reinforcement panels 29. The vacuum draws the layers of the composite sheet 11 together, and pulls out any air trapped anywhere between the layer of reinforcement panels 29 and the gel coat 16.

After the crack-resistant composite reinforcement layer 28 hardens, the vacuum bag is removed from the mold 12. When the composite sheet 11 is fully cured, the sheet 11 is removed from the mold 12. The sheet 11 may be removed from the mold 12 by a lifting mechanism (not shown) and moved to a location for additional processing, such as trimming and inspection.

Alternatively, a press platen may be used to apply pressure to the composite sheet 11 to aid in eliminating air bubbles. It is also within the scope of the invention, however, to allow free curing of the resin without the application of pressure.

Figure 4:
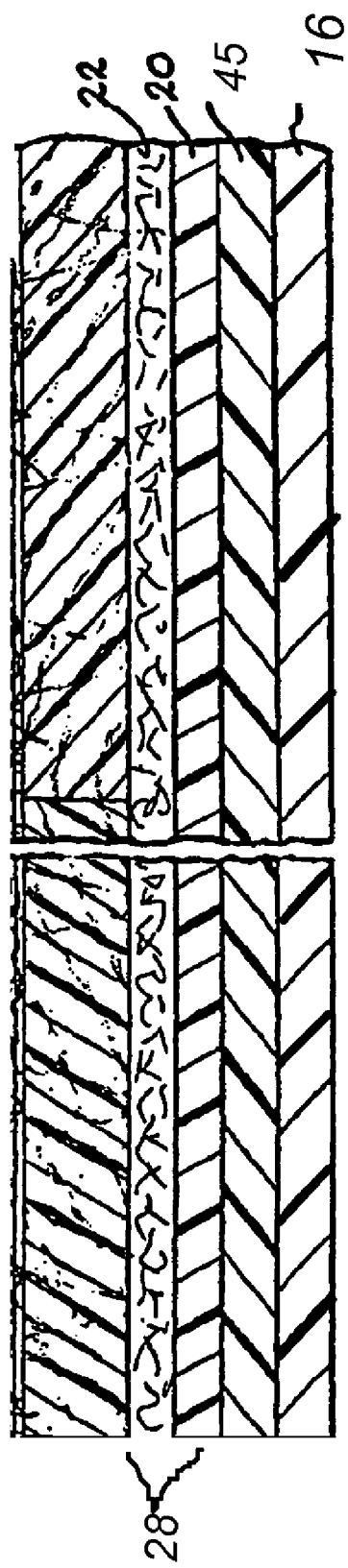
FIG. 4 is an enlarged cross-sectional view in elevation of a further variation of the composite sheet of FIG. 2.

In a second embodiment of the process of the invention (see FIG. 4), a barrier layer 45, of a material commercially available from ITW or from Ashland, is formed on the gel coat 16 before the resin material 20 and chopped fibers 22 are applied.

The principle and mode of operation of this invention have been described with reference to the preferred embodiments. However, it should be noted that this invention may be practiced otherwise than as specifically illustrated and described without departing from its scope. For example, the mold 12 may be movable relative to a plurality of stationary manufacturing operations, such as the gel coat sprayer 18, the resin sprayer 24, and the fiberglass applicator 26, as described in commonly-assigned U.S. Pat. No. 6,854,499, or may be used in a continuous molding process as described in commonly-assigned U.S. Pat. No. 6,755,633, both of which are incorporated herein by reference.

The inventor has found that this invention provides a composite sheet suitable for use as an RV exterior wall panel, and does so using a well-understood high-productivity mold process. In addition, a sheet made according to the present invention has advantages over conventional panels, being highly resistant to the formation of cracks, and also to the propagation of any small cracks that may nonetheless form. In the embodiment that incorporates self-healing micro-capsules, indeed, any microcracks that do form, can be mended by the material itself before there is an opportunity for them to expand.

Many additional variations and modifications of the foregoing embodiments will now be apparent to those skilled in the art, and thus, the scope of this invention is not to be limited by the details of the foregoing embodiments, but rather is set out by the scope of the following claims.

What is claimed is:

1. A composite sheet, comprising:
at least one outer coat of material;
at least one coat of a resin material and reinforcement material on the outer coat to form a first reinforcement layer, the resin material comprising a curable resin; and
a reinforcement panel on and bonded to the first reinforcement layer,
wherein the resin material further contains a filler that comprises hollow micro-capsules that contain materials that, upon rupture of a given one of the micro-capsules, mix and react to form a material compatible with the resin of the resin material that bonds with an adjacent portion of the first reinforcement layer.

2. The composite sheet according to claim 1, wherein the filler material further comprises a material selected from the group consisting of calcium carbonate and mica.

3. The composite sheet according to claim 1, wherein the resin is a low-shrinkage resin.

4. The composite sheet according to claim 1, wherein the glass-fiber reinforcement material includes fibrous reinforcement material that comprises glass fibers having a nominal length of about 0.5 in. to about 1.0 inch.

5. The composite sheet according to claim 1, wherein the glass-fiber reinforcement material includes fibrous reinforcement material that comprises glass fibers which predominantly have a nominal length of about 0.5 inch.

6. The composite sheet according to claim 1, further comprising a barrier layer provided between the outer coat and the first reinforcement layer, the barrier layer comprising a curable resin, and optionally either fibers or a filler or both.

* * * * *